United States Patent
Jiang et al.

(10) Patent No.: US 10,042,208 B2
(45) Date of Patent: Aug. 7, 2018

(54) LIQUID CRYSTAL ALIGNMENT METHOD, PIXEL STRUCTURE, DISPLAY PANEL AND DISPLAY DEVICE

(71) Applicants: BOE TECHNOLOGY GROUP CO., LTD., Beijing (CN); HEFEI XINSHENG OPTOELECTRONICS TECHNOLOGY CO., LTD., Hefei, Anhui (CN)

(72) Inventors: Liangliang Jiang, Beijing (CN); Songyang Jiang, Beijing (CN); Lei Guo, Beijing (CN)

(73) Assignees: BOE TECHNOLOGY GROUP CO., LTD., Beijing (CN); HEFEI XINGSHENG OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 47 days.

(21) Appl. No.: 15/502,168
(22) PCT Filed: May 19, 2016
(86) PCT No.: PCT/CN2016/082606
§ 371 (c)(1),
(2) Date: Feb. 6, 2017
(87) PCT Pub. No.: WO2017/152497
PCT Pub. Date: Sep. 14, 2017

(65) Prior Publication Data
US 2018/0164644 A1    Jun. 14, 2018

(30) Foreign Application Priority Data
Mar. 9, 2016 (CN) .......................... 2016 1 0133502

(51) Int. Cl.
*G02F 1/13* (2006.01)
*G02F 1/1337* (2006.01)
*G02F 1/1335* (2006.01)

(52) U.S. Cl.
CPC ...... *G02F 1/133753* (2013.01); *G02F 1/1335* (2013.01); *G02F 1/133788* (2013.01)

(58) Field of Classification Search
CPC ......... G02F 1/134309; G02F 1/133788; G02F 1/1335; G02F 1/133753
See application file for complete search history.

(56) References Cited

U.S. PATENT DOCUMENTS

| 5,434,687 | A | * | 7/1995 | Kawata | ............. G02F 1/133753 349/110 |
| 5,610,743 | A | * | 3/1997 | Tsai | .................. G02F 1/133753 349/124 |

(Continued)

FOREIGN PATENT DOCUMENTS

| CN | 102221758 | 10/2011 |
| CN | 102221758 A | 10/2011 |

(Continued)

OTHER PUBLICATIONS

International Search Report and Written Opinion in PCT/CN2016/082606 dated Oct. 31, 2016, with English translation. 15 pages.

(Continued)

*Primary Examiner* — James Dudek
(74) *Attorney, Agent, or Firm* — Womble Bond Dickson (US) LLP

(57) ABSTRACT

Embodiments of the invention disclose a liquid crystal alignment method, a pixel structure, a display panel, and a display device, which pertain to the field of display technologies. The liquid crystal alignment method comprises: forming, on a first substrate, at least two spaced apart annular electrode lines; forming an alignment film on the first substrate on which the at least two spaced apart annular electrode lines are formed; disposing a convex lens on the first substrate on which the alignment film is formed, the center point of the convex surface of the convex lens being in contact with the alignment film; irradiating the flat surface of the convex lens with a light source such that the alignment film is formed into an alignment structure, the alignment (Continued)

structure comprising a plurality of annular grooves nested from inside to outside, the orthographic projection of the plurality of annular grooves on a layer where the annular electrode lines reside being located in a spacing region of the at least two spaced apart annular electrode lines; adding a plurality of liquid crystal molecules into the alignment structure such that the plurality of liquid crystal molecules enclose a plurality of annular structures nested from inside to outside. The problem that the quality of the displayed picture is poor can be alleviated or mitigated, and the effect of enhancing the quality of the displayed picture can be achieved.

19 Claims, 5 Drawing Sheets

(56) References Cited

U.S. PATENT DOCUMENTS 6,512,563 B1 * 1/2003 Tajima .............. G02F 1/133753
                                                      349/123
2002/0145701 A1 * 10/2002 Sun ................... G02F 1/134309
                                                      349/200
2006/0033853 A1 * 2/2006 Lee ................... G02F 1/133707
                                                      349/42
2012/0064441 A1    3/2012 Shigeki
2016/0342032 A1   11/2016 Jiang et al.

FOREIGN PATENT DOCUMENTS

| CN | 102866539 | 1/2013 |
| CN | 102866539 A | 1/2013 |
| CN | 104808395 | 7/2015 |
| CN | 104808395 A | 7/2015 |
| CN | 105527759 A | 4/2016 |

OTHER PUBLICATIONS

"First office action," CN Application No. 201610133502.0 (dated Feb. 24, 2018).

* cited by examiner

LIQUID CRYSTAL ALIGNMENT METHOD, PIXEL STRUCTURE, DISPLAY PANEL AND DISPLAY DEVICE

RELATED APPLICATIONS

The present application is the U.S. national phase entry of PCT/CN2016/082606, with an international filing date of May 19, 2016, which claims the benefit of Chinese Patent Application NO. 201610133502.0, filed on Mar. 9, 2016, the entire disclosure of which is incorporated herein by reference.

FIELD OF THE INVENTION

The present disclosure relates to the field of display technologies, and particularly to a liquid crystal alignment method, a pixel structure, a display panel and a display device.

BACKGROUND

A liquid crystal display (LCD) is a kind of widely used flat panel display. The liquid crystal display achieves gray-scale display mainly by modulating the light field intensity of the backlight via a liquid crystal switch, while achieving color display in connection with the color filtering function of an optical filter. The LCD has a variety of display modes, among which the Fringe Field Switching (FFS) mode and the Advanced Super Dimension Switch (ADS) mode are display modes having advantages such as high contrast, high transmittance, wide viewing angle and the like. In the ADS mode and FFS mode, liquid crystal molecules are rotated within a horizontal plane on the surface of the electrode, there is a great difference in the birefringence between the liquid crystal molecules, moreover, the liquid crystal molecules are arranged in a direction perpendicular to the major axes of the liquid crystal molecules, there is a great difference in the optical path difference (i.e. optical retardation) at different viewing angles (i.e. upper viewing angle, lower viewing angle, left viewing angle and right viewing angle), thus the problem of color cast is serious at a large viewing angle. In general, the incident light parallel to the major axis direction of the liquid crystal molecules is bluish, and the incident light perpendicular to the major axis direction of the liquid crystal molecules is yellowish. Therefore, there is a need to address the problem of color cast in the ADS mode.

In the prior art, the problem of color cast in the ADS mode is usually solved by dual-domain technique. Specifically, the structure of the electrode line (which is used to form an electric field that controls the deflection of liquid crystal molecules) is designed as two portions within one and the same pixel structure (the pixel structure is a dual-domain pixel structure). The two portions are an upper portion and a lower portion, which are symmetric to each other. Driven by the electrode lines, the liquid crystal molecules in the upper portion and the liquid crystal molecules in the lower portion are respectively deflected towards two directions, such that a locally symmetric structure is formed within the entire pixel structure. In this way, the color of the incident light parallel to the major axis direction of the liquid crystal molecules and the color of the incident light perpendicular to the major axis direction of the liquid crystal molecules can be partially canceled out, improving the problem of color cast.

However, since the liquid crystal molecules in the above pixel structure are arranged in accordance with the major axis, the liquid crystal molecules cannot achieve full symmetry state in the entire pixel structure, thus the influences resulting from the difference in the birefringence between the liquid crystal molecules and the difference in the optical retardation cannot be completely eliminated, and the color cast for the pixel structure at different viewing angles is still high, especially at the upper viewing angle and the lower viewing angle, hence the quality of the displayed picture is poor.

SUMMARY

To alleviate or mitigate the problem that the quality of the displayed picture is poor, embodiments of the invention provide a liquid crystal alignment method, a pixel structure, a display panel, and a display device.

An embodiment of the invention provides a liquid crystal alignment method, the method may comprise the following steps:

forming at least two spaced apart annular electrode lines on a first substrate; forming an alignment film on the first substrate on which the at least two spaced apart annular electrode lines are formed; disposing a convex lens on the first substrate on which the alignment film is formed, the convex lens being enclosed by a flat surface and a convex surface, a center point of the convex surface of the convex lens being in contact with the alignment film; irradiating the flat surface of the convex lens with a light source such that the alignment film is formed into an alignment structure, the alignment structure comprising a plurality of annular grooves nested from inside to outside, an orthographic projection of the plurality of annular grooves on a layer where the annular electrode lines reside being located in a spacing region of the at least two spaced apart annular electrode lines; and adding a plurality of liquid crystal molecules into the alignment structure such that the plurality of liquid crystal molecules enclose a plurality of annular structures nested from inside to outside.

In some embodiments, each of the annular grooves may have a width of 10 μm to 200 μm.

In some embodiments, a total exposure of the light source may be 1000 mJ/cm$^2$ to 3000 mJ/cm$^2$, a distance between the light source and the first substrate may be 1 mm to 10 mm, and a radius of curvature of the convex lens may be 5 m.

In some embodiments, the step of forming at least two spaced apart annular electrode lines on a first substrate may comprise forming, on the first substrate, the at least two spaced apart annular electrode lines by patterning process.

In some embodiments, the light source may be an ultraviolet point light source of linearly polarized light.

Another embodiment of the invention provides a pixel structure that has a circular ring shape. The pixel structure may comprise at least two spaced apart annular electrode lines and an alignment structure above a layer where the annular electrode lines reside. The alignment structure may comprise a plurality of annular grooves nested from inside to outside, and an orthographic projection of the plurality of annular grooves on the layer where the annular electrode lines reside is located in a spacing region of the at least two spaced apart annular electrode lines. In some embodiments, the at least two spaced apart annular electrode lines may be provided on the first substrate.

In some embodiments, liquid crystal molecules may enclose within the alignment structure a plurality of annular structures nested from inside to outside.

In some embodiments, the alignment structure may be formed by the following steps: forming an alignment film on the layer where the annular electrode lines reside, disposing a convex lens above the formed alignment film, the convex lens being enclosed by a flat surface and a convex surface, a center point of the convex surface of the convex lens being in contact with the alignment film, irradiating the flat surface of the convex lens with a light source so that the alignment film is formed into the alignment structure.

In some embodiments, each of the annular grooves may have a width of 10 μm to 200 μm.

In some embodiments, a total exposure of the light source is 1000 mJ/cm² to 3000 mJ/cm², a distance between the light source and the first substrate is 1 mm to 10 mm, and a radius of curvature of the convex lens is 5 m.

In some embodiments, the light source may be an ultraviolet point light source of linearly polarized light.

Another embodiment of the invention provides a display panel, the display panel may comprise a first substrate, a second substrate, and a liquid crystal layer between the first substrate and the second substrate. The first substrate may be provided with the pixel structure according to any one of the aforegoing embodiments.

A further embodiment of the present invention provides a display device which may comprise the display panel described in the aforegoing embodiments.

With the liquid crystal alignment method provided by embodiments of the present invention, an alignment film is formed on the annular electrode lines, a convex lens is disposed on the first substrate where the alignment film is formed, and the flat surface of the convex lens is irradiated with a light source, such that the alignment film is formed into an alignment structure comprising a plurality of annular grooves nested from inside to outside, and finally a plurality of liquid crystal modules enclose a plurality of annular structures nested from inside to outside. Therefore, as compared to the prior art, the liquid crystal molecules are not arranged along a direction perpendicular to the major axes thereof, that is, the liquid crystal molecules are no longer arranged in accordance with a single direction. Consequently, the liquid crystal alignment method can alleviate or eliminate the influences resulting from the difference in the birefringence between the liquid crystal molecules and the difference in optical retardation, thereby further improving the color cast at different viewing angles and enhancing the quality of the displayed picture.

BRIEF DESCRIPTION OF THE DRAWINGS

To illustrate the technical solutions in embodiments of the invention more clearly, the drawings required for describing the embodiments will be simply introduced below. Apparently, the drawings described below are merely some embodiments of the present invention. Those ordinarily skilled in the art may obtain other drawings based on these drawings without inventive efforts.

Some embodiments of the invention have been shown by the above drawings and will be described in more detail hereinafter. These drawings and literal descriptions are not intended to limit the scope of the concept of the invention in any manner, but rather illustrate the concept of the present disclosure for those skilled in the art with reference to specific embodiments.

DETAILED DESCRIPTION OF THE EMBODIMENTS

To make the objective, technical solutions and advantages of embodiments of the invention clearer, some example implementations of the embodiments of the invention will be described below in further detail with reference to the accompanying drawings.

Figure 1:
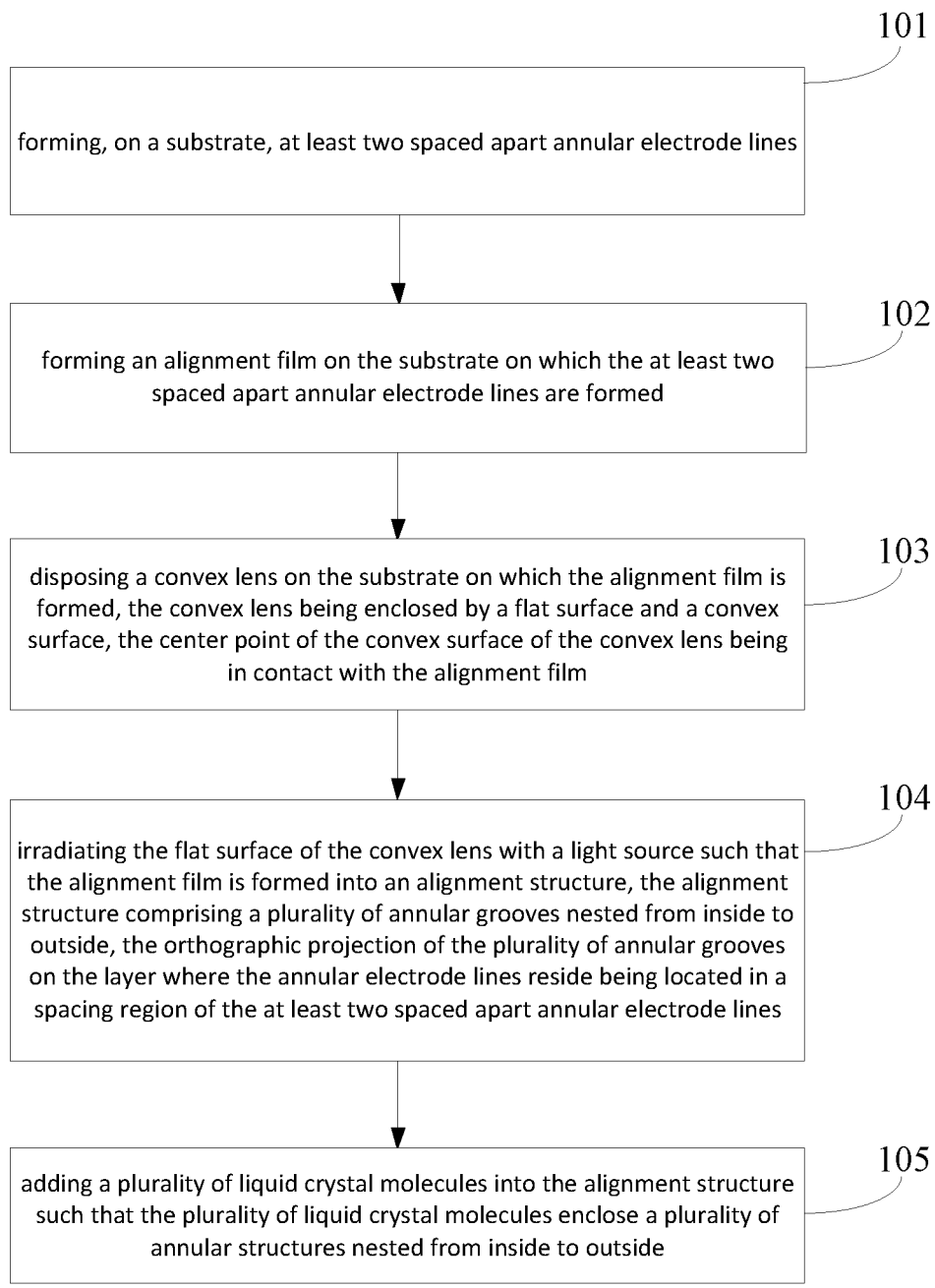
FIG. 1 is a flow chart of a liquid crystal alignment method provided by an embodiment of the present invention.

Embodiments of the invention provide a liquid crystal alignment method. As shown in FIG. 1, the liquid crystal alignment method comprises the following steps:

step 101, forming, on a first substrate, at least two spaced apart annular electrode lines;

step 102, forming an alignment film on the first substrate on which the at least two spaced apart annular electrode lines are formed;

step 103, disposing a convex lens on the first substrate on which the alignment film is formed, the convex lens being enclosed by a flat surface and a convex surface, and the center point of the convex surface of the convex lens being in contact with the alignment film;

step 104, irradiating the flat surface of the convex lens with a light source such that the alignment film is formed into an alignment structure, the alignment structure comprises a plurality of annular grooves nested from inside to outside, and the orthographic projection of the plurality of annular grooves on the layer where the annular electrode lines reside is located in a spacing region of the at least two spaced apart annular electrode lines;

step 105, adding a plurality of liquid crystal molecules into the alignment structure such that the plurality of liquid crystal molecules enclose a plurality of annular structures nested from inside to outside.

Figure 2:
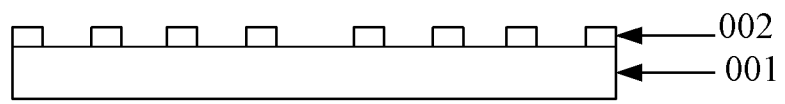
FIG. 2 is a side view of a first substrate where at least two spaced apart annular electrode lines are formed as provided by an embodiment of the invention.

As shown in FIG. 2, at least two annular electrode lines 002 disposed at intervals are formed on a first substrate 001. FIG. 2 shows a side view of the first substrate where at least two spaced apart annular electrode lines are formed. In some embodiments, the at least two spaced apart annular electrode lines may be formed on the first substrate by patterning process. For example, the process of forming the annular electrode lines may include processes such as coating, exposure, development, etching, and the like.

Figure 3:
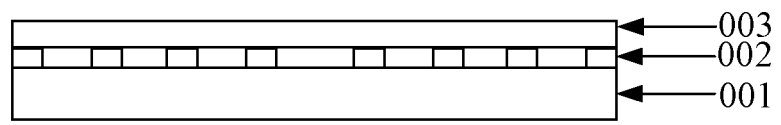
FIG. 3 is a side view of a first substrate where an alignment film is formed as provided by an embodiment of the invention.

As shown in FIG. 3, an alignment film 003 is formed on the first substrate 001 where the at least two annular electrode lines 002 disposed at intervals are formed. The process of forming an alignment film is known to those skilled in the art and will not be described in detail herein.

Figure 4:
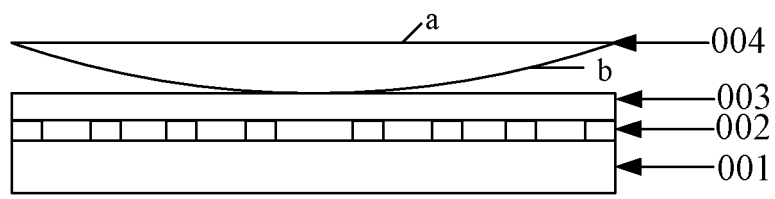
FIG. 4 is a schematic view showing a structure in which a convex lens is disposed on the first substrate as provided by an embodiment of the present invention.

As shown in FIG. 4, a convex lens 004 is arranged on the first substrate 001 where the alignment film 003 is formed.

The convex lens 004 is enclosed by a flat surface a and a convex surface b, and the center point of the convex surface b of the convex lens 004 is in contact with the alignment film 003. Reference numeral 002 in FIG. 4 denotes an annular electrode line.

Figure 5:
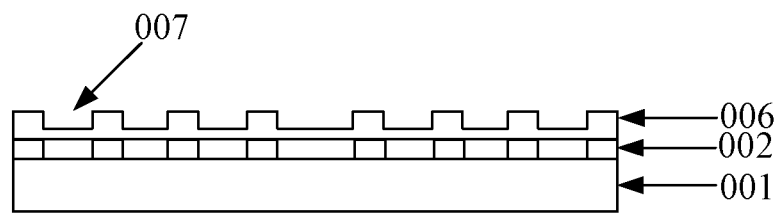
FIG. 5 illustrates an alignment structure provided by an embodiment of the present invention.

As shown in FIG. 5, the flat surface a of the convex lens is irradiated with a light source such that the alignment film is formed into an alignment structure 006. The alignment structure 006 comprises a plurality of annular grooves 007 nested from inside to outside, and the orthographic projection of the plurality of annular grooves on the layer where the annular electrode lines reside is located in a spacing region of the at least two spaced apart annular electrode lines. In FIG. 5, reference numeral 001 denotes a first substrate and reference numeral 002 denotes an annular electrode line.

Figure 6:
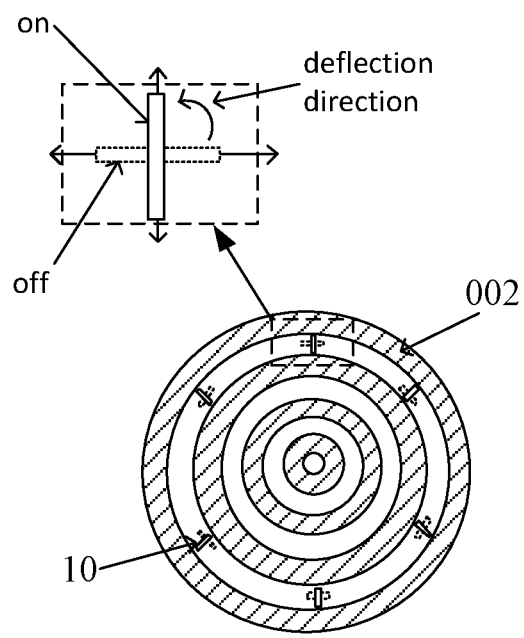
FIG. 6 is a schematic view of a pixel structure provided by an embodiment of the present invention.

Thereafter, a plurality of liquid crystal molecules are added to the alignment structure shown in FIG. 5 so that the plurality of liquid crystal molecules enclose a plurality of annular structures nested from inside to outside. The process of adding a plurality of liquid crystal molecules is known to those skilled in the art, for example, the liquid crystal molecules can be sprayed to the alignment structure via a device nozzle. FIG. 6 shows a top view of a pixel structure that utilizes the liquid crystal alignment method proposed herein. As shown in FIG. 6, a plurality of liquid crystal molecules 10 within the pixel structure enclose a plurality of annular structures nested from inside to outside. When the pixel is viewed from respective directions, the overall orientations of the plurality of liquid crystal molecules within the pixel are kept consistent. In FIG. 6, before the annular electrode line 002 is energized, the liquid crystal molecules are not deflected and are in an off state. After the annular electrode lines are energized, the liquid crystal molecules will be deflected and in an on state. The deflection direction of the liquid crystal molecules may be the direction indicated in FIG. 6.

In some embodiments, each annular groove may have a width of 10 μm to 200 μm to meet the requirements of the displayed picture and improve the quality of the displayed picture.

In some embodiments, the total exposure of the light source that irradiates the convex lens may be 1000 mJ/cm$^2$ to 3000 mJ/cm$^2$, the distance between the light source and the first substrate may be 1 mm to 10 mm, and the radius of curvature of the convex lens may be 5 m. The embodiment of the invention enables each annular groove to have a width of 10 μm to 200 μm by controlling the total exposure of the light source, the distance between the light source and the first substrate and the size of the convex lens, thereby improving the quality of the displayed picture. The light source for irradiating the convex lens may be an ultraviolet point light source of linearly polarized light. In the field of liquid crystal display, in order to complete the liquid crystal alignment, it is required to treat the surface of the first substrate so as to induce orientation and arrangement of liquid crystal molecules according to certain rules. Conventionally, a trench for the liquid crystal alignment function is formed on the surface of the substrate by rubbing process. In an embodiment of the present invention, the liquid crystal alignment is carried out by a photoalignment technique. The photoalignment technique is a non-contact type alignment technique, which irradiates a polymer film (i.e. an alignment film) having a photosensitive agent by using an ultraviolet point light source of linearly polarized light, and performs alignment for specific regions by means of reactions such as photocrosslinking, photodegradation, photoisomerization and so on, preventing the surface of the alignment film from being contaminated.

Figure 7:
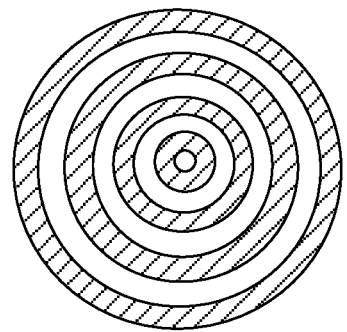
FIG. 7 is a schematic view of a Newton ring.
Figure 8:
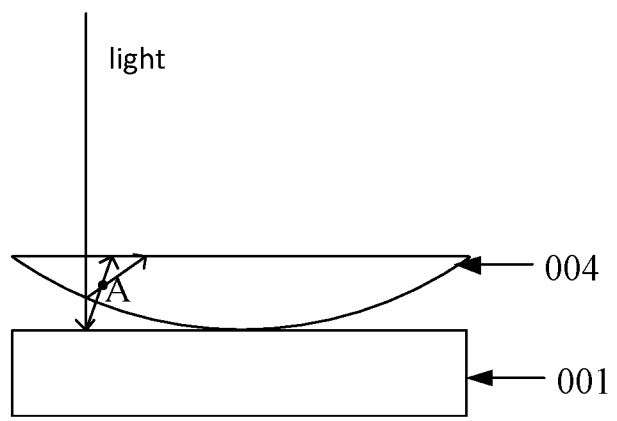
FIG. 8 illustrates creation of an interference phenomenon.

The Newton ring in physics is a thin film interference phenomenon based on the equal thickness interference principle. For example, assuming that the convex surface of a convex lens having a large radius of curvature is brought into contact with a flat glass, in daylight or upon irradiation with white light, it can be seen that the contact point of the convex lens and the flat glass is a dark spot, around which are some colored circular rings alternative with brightness and darkness. Upon irradiation with monochromatic light, then some monochromatic circles alternative with brightness and darkness are presented, as shown in FIG. 7. In an embodiment of the invention, based on the equal thickness interference principle, a convex lens having a relatively large radius of curvature is disposed on the first substrate where the alignment film is formed, and the flat surface of the convex lens is irradiated with a light source. Since there is an thin air layer between the convex surface of the convex lens and the upper surface of the first substrate, and the thickness of the thin air layer gradually increases from the center to the edge, the light reflected by the upper surface and the lower surface of the thin air layer encounters at the convex surface of the convex lens, creating an interference phenomenon. As shown in FIG. 8, the light reflected by the upper surface and the lower surface of the thin air layer encounters at a point A on the convex surface of the convex lens, creating an interference phenomenon. Therefore, after irradiating the flat surface of the convex lens with a light source, different light intensities will be generated to induce the alignment film to form an alignment structure. Adding a plurality of liquid crystal molecules into the formed alignment structure enables the plurality of liquid crystal molecules to enclose a plurality of annular structures nested from inside to outside. Finally, the liquid crystal molecules can be rotated under the effect of the electrode lines, so that they can act as light valves.

In some embodiments, at least two spaced apart annular electrode lines may be formed on the first substrate by patterning process. This formation process is relatively simple. In addition, an annular color resistance structure on the surface of a color filter (CF) substrate matching with the thin film transistor (TFT) substrate can also be implemented by means of patterning process, which will not be described in detail herein.

Just as known to those skilled in the art, the structure of the liquid crystal molecules has a characteristic of anisotropy, thus the resulting photoelectric effect varies with different directions, that is, the liquid crystal molecules have anisotropy in photoelectric properties such as dielectric constant, refraction coefficient (i.e. refractive index), and the like. For the refraction coefficient, since the liquid crystal molecules are mostly rod-shaped or butterfly-like molecules, the physical properties in the direction parallel to or perpendicular to the major axes of liquid crystal molecules would be somewhat different, and the liquid crystal molecules are also called anisotropic crystals. The refraction coefficient can be divided into vectors in two directions, which are n// and n⊥ respectively. For the liquid crystal molecules having a single optical axis, they originally have definitions of two different refraction coefficients, one of which is no, the other is ne. The "no" refers to the refraction coefficient of ordinary light, the electric field component of the light wave of ordinary light is perpendicular to the optical axis. The "ne" refers to the refraction coefficient of extraordinary light, and the electric field component of the light wave of extraordinary light is parallel to the optical axis. The birefringence Δn=ne−no, which refers to a difference between the two refraction coefficients. The birefringence is greater than zero when the traveling direction of light is perpendicular to the major axes of the liquid crystal molecules, and the birefringence is less than zero when the traveling direction of light is parallel to the major axes of the liquid crystal molecules.

Figure 9:
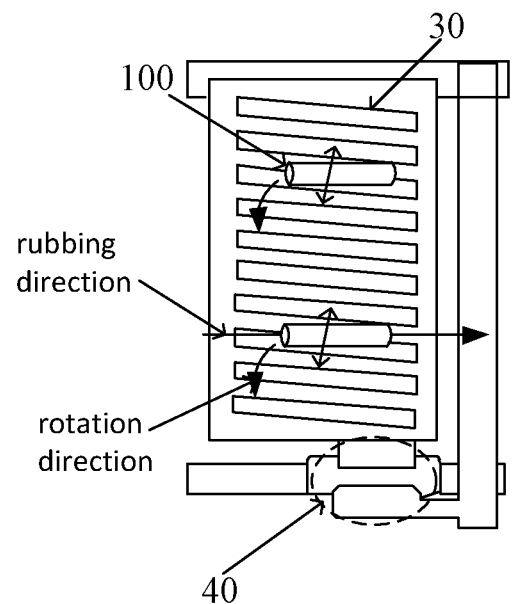
FIG. 9 is a schematic view of a conventional single-domain pixel structure.
Figure 10:
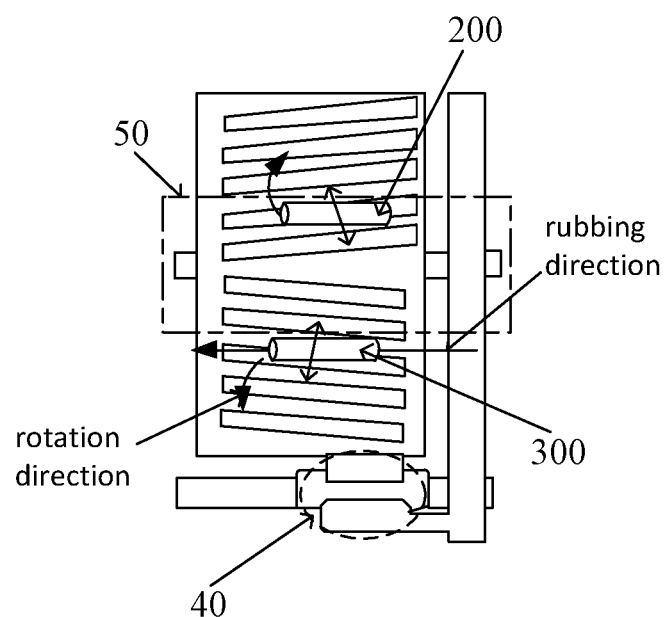
FIG. 10 is a schematic view of a conventional dual-domain pixel structure.

For the ADS mode or FFS mode in the prior art, liquid crystal molecules are rotated within a horizontal plane on the surface of electrode. However, there is a great difference in the birefringence between the liquid crystal molecules (i.e. Δn is relatively large), upon viewing from different directions, the maximum visible light wavelengths at which the incident light penetrates the liquid crystal molecules are also different, resulting in a serious color cast at a large viewing angle. FIG. 9 shows a schematic view of a single-domain pixel structure in the ADS mode in the prior art. The incident light parallel to the major axis direction of the liquid crystal molecule 100 is bluish, and the incident light perpendicular to the major axis direction of the liquid crystal molecule is yellowish. In FIG. 9, reference numeral 30 denotes an electrode line and reference numeral 40 denotes a thin film transistor (TFT). In order to solve the problem of color cast in the ADS mode, the prior art usually employs a dual-domain pixel structure. As shown in FIG. 10, in one and the same dual-domain pixel structure, the structure of the electrode line is designed as two portions. These two portions are an upper portion and a lower portion, which are symmetric to each other. Driven by the electrode lines, liquid crystal molecules 200 in the upper portion and liquid crystal molecules 300 in the lower portion are respectively deflected towards two directions, so that a locally symmetric structure is formed within the entire dual-domain pixel structure. In this way, the color of the incident light parallel to the major axis direction of the liquid crystal molecule and the color of the incident light perpendicular to the major axis direction of the liquid crystal molecule can be partially canceled out. However, the dual-domain pixel structure shown in FIG. 10 can mitigate the problem of color cast only at a specific viewing angle and in a specific range. Generally, the color cast at the left and right viewing angles is lower, and the color cast at the upper and lower viewing angles is higher. In addition, the two domains of this dual-domain pixel structure overlap in the transitional region (the region indicated by reference numeral 50 in FIG. 10), such that a liquid crystal dark region is easily formed, reducing the transmittance. In this dual-domain pixel structure, the liquid crystal molecules can not achieve 360° absolute symmetry within the entire pixel plane. Therefore, this dual-domain pixel structure cannot fundamentally eliminate the influences resulting from the difference in the refractive index between the liquid crystal molecules and the difference in the optical retardation, which consequently cannot solve the problem of color cast completely. However, the liquid crystal alignment method provided by embodiments of the present invention enables a plurality of liquid crystal molecules to enclose a plurality of annular structures nested from inside to outside, and the annularly symmetric liquid crystal molecules have a better improvement effect for color cast, because when the pixels are viewed from respective directions, the overall orientations of the plurality of liquid crystal molecules within the pixel are basically consistent, the birefringences and the optical retardation of the liquid crystal molecules are also substantially the same, the liquid crystal molecules are no longer arranged in accordance with a single direction, and the liquid crystal molecules can realize 360° symmetry within the entire pixel plane. Accordingly, the liquid crystal alignment method can alleviate or eliminate the influences resulting from the difference in the birefringence between the liquid crystal molecules and the difference in the optical retardation, which may further improve the color cast at different viewing angles and enhance the quality of the displayed picture.

The order of the steps of the liquid crystal alignment method provided by embodiments of the invention may be appropriately adjusted, and the steps may be increased or reduced according to specific circumstances. Variations that can be easily conceived by any skilled person familiar with this technical field within the scope of the present invention should be encompassed within the protection scope of the invention and thus will not be described herein.

In conclusion, as for the liquid crystal alignment method provided by embodiments of the invention, since the liquid crystal alignment method comprises forming an alignment film on the annular electrode lines, disposing a convex lens on the first substrate where the alignment film is formed, and irradiating the flat surface of the convex lens with a light source such that the alignment film is formed into an alignment structure including a plurality of annular grooves nested from inside to outside and finally a plurality of liquid crystal molecules enclose a plurality of annular structures nested from inside to outside, as compared to the prior art, the liquid crystal molecules are not arranged in a direction perpendicular to the major axes of the liquid crystal molecules, that is, the liquid crystal molecules are no longer arranged in accordance with a single direction, thus the liquid crystal alignment method can alleviate or eliminate the influences resulting from the difference in the birefringence between the liquid crystal molecules and the difference in the optical retardation, which further improves the color cast at different viewing angles and enhances the quality of the displayed picture.

An embodiment of the present invention provides a pixel structure. As shown in FIGS. 5 and 6, the pixel structure has a circular ring shape and may comprise at least two spaced apart annular electrode lines 002, and an alignment structure 006 formed above the layer where the annular electrode lines reside. The alignment structure 006 may comprise a plurality of annular grooves 007 nested from inside to outside, and the orthographic projection of the plurality of annular grooves 007 on the layer where the annular electrode lines 002 reside is located in a spacing region of the at least two spaced apart annular electrode lines.

In the embodiment shown in FIG. 5, at least two spaced apart annular electrode lines are provided on the first substrate 001.

As shown in FIG. 6, in some embodiments, the liquid crystal molecules 10 may enclose a plurality of annular structures nested from inside to outside within the alignment structure.

In some embodiments, the alignment structure 006 may be formed as follows: as shown in FIGS. 3 to 5, forming an alignment film 003 on the layer where the annular electrode lines 002 reside, disposing a convex lens 004 above the formed alignment film 003, the convex lens 004 being enclosed by a flat surface a and a convex surface b, the center point of the convex surface b of the convex lens being in contact with the alignment film 003, and irradiating the flat surface a of the convex lens with a light source such that the alignment film 003 is formed into the alignment structure 006. In some embodiments, the width of each annular groove may be 10 μm to 200 μm to meet the requirements for displaying a picture and improve the display quality of the picture.

In some embodiments, during the process of forming the alignment structure, the total exposure of the light source that irradiates the convex lens is 1000 mJ/cm² to 3000 mJ/cm², the distance between the light source and the first substrate may be 1 mm to 10 mm, and the radius of curvature of the convex lens may be 5 m. In some embodiments of the invention, by controlling the total exposure of the light source, the distance between the light source and the first substrate, and the size of the convex lens, it is enabled that each annular groove has a width of 10 μm to 200 μm, which is advantageous to improve the display quality of the picture.

In some embodiments, the light source that irradiates the convex lens may be an ultraviolet point light source of linearly polarized light.

The pixel structure provided by the embodiment of the invention has a circular ring shape, accordingly, the electrode lines are also annular in shape, and the liquid crystal molecules enclose within the alignment structure a plurality of annular structures nested from inside to outside. Therefore, when the pixels are viewed from respective directions, the overall orientations of the plurality of liquid crystal molecules within the pixels are substantially consistent, and the birefringences and the optical retardation of the liquid crystal molecules are also substantially the same, thus the problem of color cast may be mitigated, and the deficiencies in a multi-domain pixel structure (such as dual-domain pixel structure) in the prior art may be alleviated or overcome, further improving the color cast of the pixel structure at different viewing angles, and enhancing the display quality of the picture.

In conclusion, as for the pixel structure provided by the embodiment of the invention, since the pixel structure has a circular ring shape and the liquid crystal molecules can enclose within the alignment structure a plurality of annular structures nested from inside to outside, as compared to the prior art, the liquid crystal molecules are not arranged in a direction perpendicular to the major axes of the liquid crystal molecules, that is, the liquid crystal molecules are no longer arranged in accordance with a single direction, thus the pixel structure can alleviate or eliminate the influences resulting from the difference in the birefringence between the liquid crystal molecules and the difference in the optical retardation, which further improves the color cast for the pixel structure at different viewing angles and enhances the display quality of the picture.

A further embodiment of the invention provides a display panel, comprising a first substrate, a second substrate, and a liquid crystal layer between the first substrate and the second substrate. The first substrate may be provided with the pixel structure shown in FIG. 6.

In conclusion, as for the display panel provided by the embodiment of the invention, the first substrate of which display panel is provided with a pixel structure, since the pixel structure has a circular ring shape and the liquid crystal molecules enclose within the alignment structure a plurality of annular structures nested from inside to outside, as compared to the prior art, the liquid crystal molecules are not arranged in a direction perpendicular to the major axes of the liquid crystal molecules, that is, the liquid crystal molecules are no longer arranged in accordance with a single direction, thus the pixel structure can alleviate or eliminate the influences resulting from the difference in the birefringence between the liquid crystal molecules and the difference in optical retardation, which further improves the color cast for the pixel structure at different viewing angles and enhances the quality of the displayed picture.

A further embodiment of the invention provides a display device comprising the display panel described above in the embodiment of a display panel.

In conclusion, as for the display device provided by the embodiment of the invention, since the pixel structure of the display panel included in the display device has a circular ring shape and the liquid crystal molecules enclose within the alignment structure a plurality of annular structures nested from inside to outside, as compared to the prior art, the liquid crystal molecules are not arranged in a direction perpendicular to the major axes of the liquid crystal molecules, that is, the liquid crystal molecules are no longer arranged in accordance with a single direction, thus the pixel structure can alleviate or eliminate the influences resulting from the difference in the birefringence between the liquid crystal molecules and the difference in optical retardation, which may improve the color cast of the pixel structure at different viewing angles and enhance the quality of the picture to be displayed.

What are described above are only some embodiments of the invention and are not intended to limit the invention. Any modifications, equivalent substitutions, improvements and the like within the spirit and principle of the present disclosure should be encompassed within the protection scope of the invention.

The invention claimed is:

1. A liquid crystal alignment method, comprising:
   forming at least two spaced apart annular electrode lines on a first substrate;
   forming an alignment film on the first substrate on which the at least two spaced apart annular electrode lines are formed;
   disposing a convex lens on the first substrate on which the alignment film is formed, the convex lens being enclosed by a flat surface and a convex surface, a center point of the convex surface of the convex lens being in contact with the alignment film;
   irradiating the flat surface of the convex lens with a light source such that the alignment film is formed into an alignment structure, the alignment structure comprising a plurality of annular grooves nested from inside to outside, an orthographic projection of the plurality of annular grooves on a layer where the annular electrode lines reside being located in a spacing region of the at least two spaced apart annular electrode lines;
   adding a plurality of liquid crystal molecules into the alignment structure such that the plurality of liquid crystal molecules enclose a plurality of annular structures nested from inside to outside.

2. The method according to claim 1, wherein each of the annular grooves has a width of 10 μm to 200 μm.

3. The method according to claim 2, wherein a total exposure of the light source is 1000 mJ/cm² to 3000 mJ/cm², a distance between the light source and the first substrate is 1 mm to 10 mm, a radius of curvature of the convex lens is 5 m.

4. The method according to claim 1, wherein the step of forming at least two spaced apart annular electrode lines on a first substrate comprises forming the at least two spaced apart annular electrode lines on the first substrate by patterning process.

5. The method according to claim 1, wherein the light source is an ultraviolet point light source of linearly polarized light.

6. A pixel structure, the pixel structure having a circular ring shape and comprising:
   at least two spaced apart annular electrode lines, and
   an alignment structure above a layer where the annular electrode lines reside,
   wherein the alignment structure comprises a plurality of annular grooves nested from inside to outside, wherein an orthographic projection of the plurality of annular grooves on the layer where the annular electrode lines reside is located in a spacing region of the at least two spaced apart annular electrode lines.

7. The pixel structure according to claim 6, wherein the at least two spaced apart annular electrode lines are provided on the first substrate.

8. The pixel structure according to claim 7, wherein liquid crystal molecules enclose within the alignment structure a plurality of annular structures nested from inside to outside.

9. The pixel structure according to claim 7, wherein the alignment structure is formed by the following steps:
   forming an alignment film on the layer where the annular electrode lines reside,
   disposing a convex lens above the formed alignment film, the convex lens being enclosed by a flat surface and a convex surface, a center point of the convex surface of the convex lens being in contact with the alignment film, and
   irradiating the flat surface of the convex lens with a light source so that the alignment film is formed into the alignment structure.

10. The pixel structure according to claim 6, wherein each of the annular grooves has a width of 10 μm to 200 μm.

11. The pixel structure according to claim 9, wherein during a process of forming the alignment structure, a total exposure of the light source is 1000 mJ/cm$^2$ to 3000 mJ/cm$^2$, a distance between the light source and the first substrate is 1 mm to 10 mm, a radius of curvature of the convex lens is 5 m.

12. The pixel structure according to claim 9, wherein the light source is an ultraviolet point light source of linearly polarized light.

13. A display panel comprising a first substrate, a second substrate and a liquid crystal layer between the first substrate and the second substrate, wherein the first substrate is provided with a pixel structure, the pixel structure having a circular ring shape and comprising:
   at least two spaced apart annular electrode lines, and
   an alignment structure above a layer where the annular electrode lines reside,
   wherein the alignment structure comprises a plurality of annular grooves nested from inside to outside, wherein an orthographic projection of the plurality of annular grooves on the layer where the annular electrode lines reside is located in a spacing region of the at least two spaced apart annular electrode lines.

14. The display panel according to claim 13, wherein the at least two spaced apart annular electrode lines are provided on the first substrate.

15. The display panel according to claim 14, wherein liquid crystal molecules enclose within the alignment structure a plurality of annular structures nested from inside to outside.

16. The display panel according to claim 14, wherein the alignment structure is formed by the following steps:
   forming an alignment film on the layer where the annular electrode lines reside,
   disposing a convex lens above the formed alignment film, the convex lens being enclosed by a flat surface and a convex surface, a center point of the convex surface of the convex lens being in contact with the alignment film, and
   irradiating the flat surface of the convex lens with a light source so that the alignment film is formed into the alignment structure.

17. The display panel according to claim 13, wherein each of the annular grooves has a width of 10 μm to 200 μm.

18. The display panel according to claim 17, wherein during a process of forming the alignment structure, a total exposure of the light source is 1000 mJ/cm$^2$ to 3000 mJ/cm$^2$, a distance between the light source and the first substrate is 1 mm to 10 mm, a radius of curvature of the convex lens is 5 m.

19. The display panel according to claim 16, wherein the light source is an ultraviolet point light source of linearly polarized light.

* * * * *